(12) United States Patent
Aoshima et al.

(10) Patent No.: US 6,477,020 B1
(45) Date of Patent: Nov. 5, 2002

(54) MAGNETO-RESISTIVE HEAD AND MAGNETIC RECORDING AND REPRODUCING APPARATUS

(75) Inventors: Kenichi Aoshima; Hitoshi Kanai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/437,650

(22) Filed: Nov. 10, 1999

(30) Foreign Application Priority Data

Apr. 20, 1999 (JP) .......................................... 11-112790

(51) Int. Cl.⁷ ................................................ G11B 5/39
(52) U.S. Cl. ............................ 360/327.31; 360/324.12
(58) Field of Search ............................ 360/324, 324.1, 360/324.11, 324.12, 324.2, 327.1, 327.2, 327.23, 327.3, 327.31

(56) References Cited

U.S. PATENT DOCUMENTS

| | | | | |
|---|---|---|---|---|
| 5,434,826 A | * | 7/1995 | Ravipati et al. | 360/327.31 |
| 6,111,722 A | * | 8/2000 | Fukuzawa et al. | 360/324.12 |
| 6,144,534 A | * | 11/2000 | Xue et al. | 360/327.31 |
| 6,157,526 A | * | 12/2000 | Watanabe et al. | 360/324.12 |

FOREIGN PATENT DOCUMENTS

| | | |
|---|---|---|
| JP | 9097409 | 4/1997 |
| JP | 10312512 | 11/1998 |

* cited by examiner

*Primary Examiner*—David L. Ometz
(74) *Attorney, Agent, or Firm*—Greer, Burns & Crain, Ltd.

(57) ABSTRACT

A magneto-resistive head includes a stabilizing bias layer which applies a magnetization stabilizing bias field on a magneto-resistive layer of a magneto-resistive element, and a ferromagnetic underlayer which forms an underlayer with respect to the stabilizing bias layer. The ferromagnetic underlayer is made of Fe and has a film thickness in a range of 1.3 to 2.5 nm.

13 Claims, 11 Drawing Sheets

MAGNETO-RESISTIVE HEAD AND MAGNETIC RECORDING AND REPRODUCING APPARATUS

BACKGROUND OF THE INVENTION

1. Field of the Invention

The present invention generally relates to magneto-resistive effect type (hereinafter simply referred to as magneto-resistive) heads and magnetic recording and reproducing apparatuses, and more particularly to a magneto-resistive head which uses a stabilizing bias layer to apply a magnetization stabilizing bias field on a magneto-resistive layer, and to a magnetic recording and reproducing apparatus which is provided with such a magneto-resistive head.

2. Description of the Related Art

Figure 1:
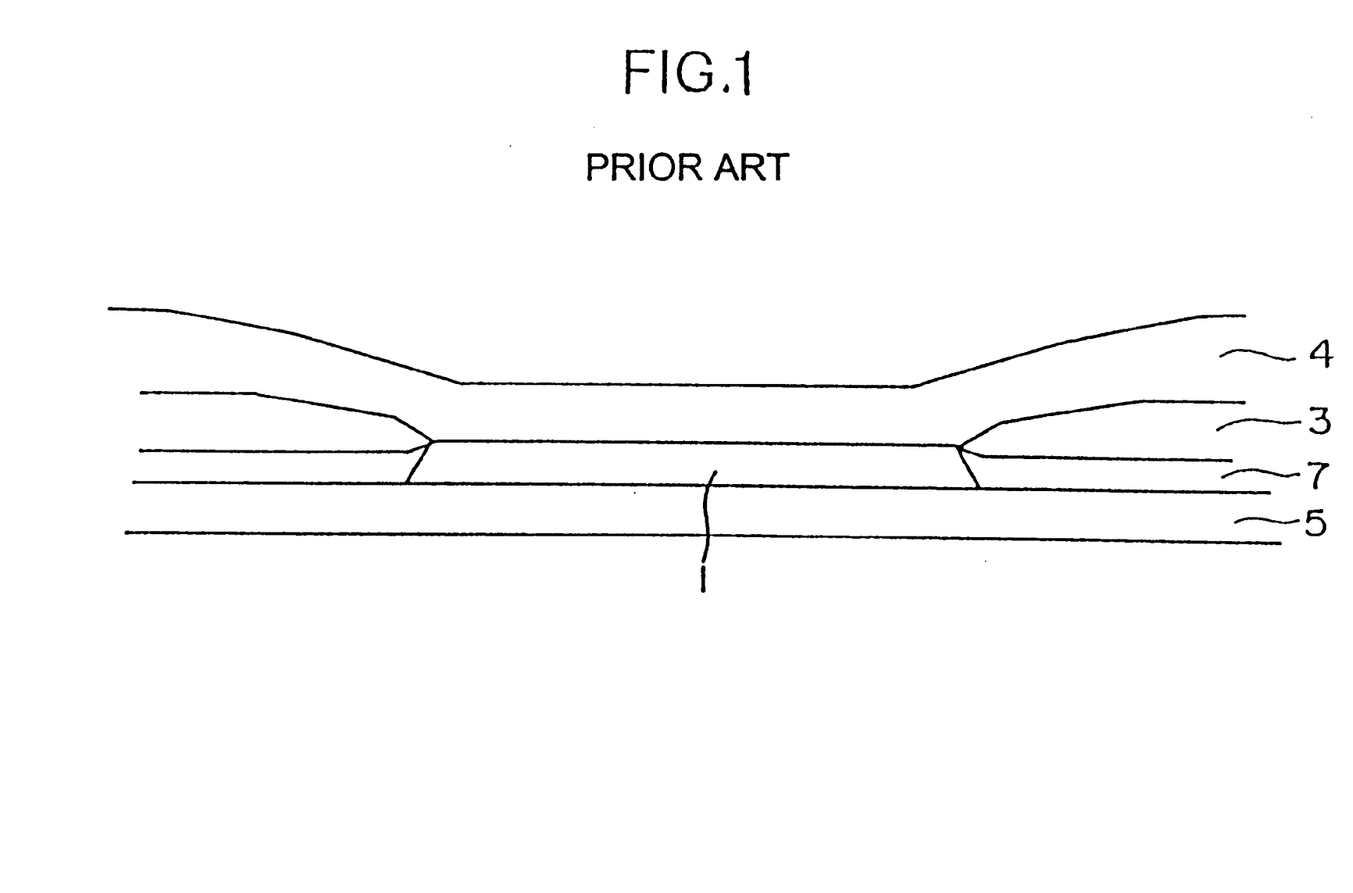
FIG. 1 is a cross sectional view showing an important part of a conventional magneto-resistive head.

FIG. 1 is a cross sectional view showing an important part of a conventional magneto-resistive head. As shown in FIG. 1, the conventional magneto-resistive head has a rectangular magneto-resistive element (spin valve element) 1 connected to element terminals 3, and the top and bottom of the magneto-resistive element 1 and the element terminals 3 are respectively insulated by alumina ($Al_2O_3$) layers 4 and 5. In addition, two soft magnetic layers (not shown) made of a soft magnetic material such as NiFe respectively shield the top of the alumina layer 4 and the bottom of the alumina layer 5.

The reproducing element is provided with vertical bias applying layers 7 for stabilizing the reproduced output, and a hard magnetic material is used for the vertical bias applying layers 7. It is known that the hard magnetic characteristic can be improved by using a thin film having a bcc crystal structure for an underlayer of the hard magnetic material.

For example, a Japanese Laid-Open Patent Application No. 9-97409 proposes improving the stabilization of the reproduced output by using the thin film having the bcc crystal structure for the underlayer of the hard magnetic material. It is regarded that the improved stabilization of the reproduced output is achieved by the transfer coupling of the ferromagnetic material such as Fe and a free layer of the spin valve element. For example, in a case where CoCrPt is used as the hard magnetic material with respect to the underlayer which is made of Fe with a thickness of 10 nm or made of FeCr with a thickness of 10 nm, the magnetic field becomes 1000 to 1200 Oe, and it is possible to effectively suppress the Barkhausen noise.

The specific resistance of CoCrPt which is used as the hard magnetic material is 60 to 80 $\mu\Omega$cm and is high. For this reason, there was a problem in that the resistance of the magneto-resistive head as a whole becomes large, thereby causing head noise (white noise) and deteriorating the head characteristic.

In addition, the residual magnetization of CoCrPt which is used as the hard magnetic material is low, and it is necessary to increase the film thickness in order to obtain a sufficiently satisfactory head characteristic. However, when the film thickness of the hard magnetic material is large, there was a problem in that undulations are formed in the write head, thereby deteriorating the recording and reproducing characteristic.

Figure 2:
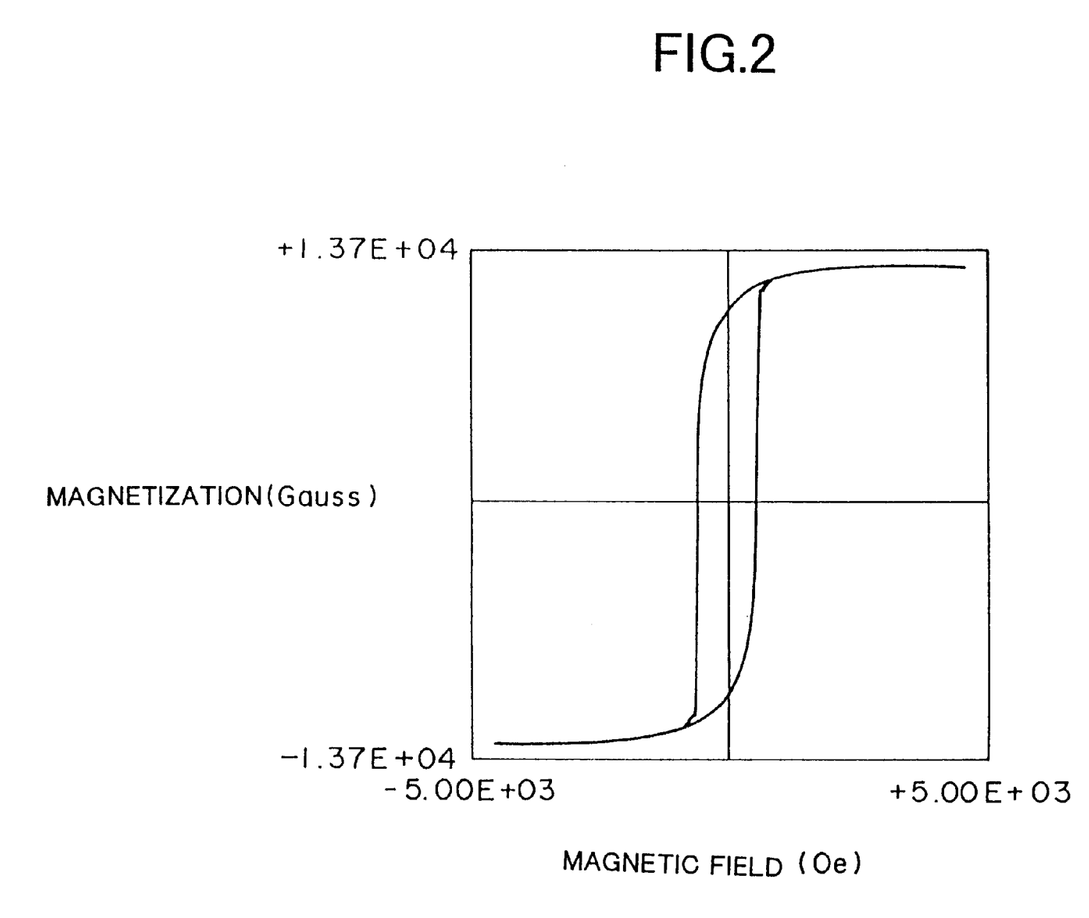
FIG. 2 is a diagram showing a characteristic of a ferromagnetic underlayer having a bcc crystal structure.

Furthermore, in a case where CoPt which has a high magnetic flux density is used as the hard magnetic material and the ferromagnetic underlayer having the bcc crystal structure as proposed in the Japanese Laid-Open Patent Application No. 9-97409 is used, there was a problem in that it is difficult to obtain a satisfactory hard magnetic characteristic, as may be seen from FIG. 2. FIG. 2 is a diagram showing the characteristic of the ferromagnetic underlayer having the bcc crystal structure, for a case where the thickness of the Fe layer is 3 nm and the thickness of the CoPt layer is 10 nm. In FIG. 2, the ordinate indicates the magnetization in Gauss, and the abscissa indicates the magnetic field in Oe.

SUMMARY OF THE INVENTION

Accordingly, it is a general object of the present invention to provide a novel and useful magneto-resistive head and magnetic recording and reproducing apparatus, in which the problems described above are eliminated.

Another and more specific object of the present invention is to provide a magneto-resistive head and magnetic recording and reproducing apparatus, which can reduce the head noise and obtain a satisfactory head characteristic, prevent deterioration of the recording and reproducing characteristic by preventing undulations from being formed in the write head, so that a satisfactory hard magnetic characteristic can be obtained.

Still another object of the present invention is to provide a magneto-resistive head comprising a stabilizing bias layer which applies a magnetization stabilizing bias field on a magneto-resistive layer of a magneto-resistive element, and a ferromagnetic underlayer which forms an underlayer with respect to the stabilizing bias layer, where the ferromagnetic underlayer is made of Fe and has a film thickness in a range of 1.3 to 2.5 nm. According to the magneto-resistive head of the present invention, it is possible to reduce the head noise and obtain a satisfactory head characteristic, and to prevent undulations from being generated in the write head so as to prevent deterioration of the recording and reproducing characteristics, and it is possible to obtain a satisfactory hard magnetic characteristic.

A further object of the present invention is to provide a magneto-resistive head comprising a stabilizing bias layer which applies a magnetization stabilizing bias field on a magneto-resistive layer of a magneto-resistive element, and a ferromagnetic underlayer which forms an underlayer with respect to the stabilizing bias layer, where the ferromagnetic underlayer is made of a Fe-based alloy which is added with at least one element selected from a group of Co, Ni, Cr, Nb, Mo, Ta, V and W, and has a film thickness in a range of 2.5 to 4.9 nm. According to the magneto-resistive head of the present invention, it is possible to reduce the head noise and obtain a satisfactory head characteristic, and to prevent undulations from being generated in the write head so as to prevent deterioration of the recording and reproducing characteristics, and it is possible to obtain a satisfactory hard magnetic characteristic.

Another object of the present invention is to provide a magneto-resistive head comprising a stabilizing bias layer which applies a magnetization stabilizing bias field on a magneto-resistive layer of a magneto-resistive element, and a ferromagnetic underlayer which forms an underlayer with respect to the stabilizing bias layer, where the ferromagnetic underlayer is made of a Fe-based alloy which is added with at least one element selected from a group of Pt, Pd, Ir, Rh, Ru and Au. According to the magneto-resistive head of the present invention, it is possible to reduce the head noise and obtain a satisfactory head characteristic, and to prevent undulations from being generated in the write head so as to prevent deterioration of the recording and reproducing characteristics, and it is possible to obtain a satisfactory hard magnetic characteristic.

Still another object of the present invention is to provide a magneto-resistive head comprising a stabilizing bias layer which applies a magnetization stabilizing bias field on a magneto-resistive layer of a magneto-resistive element, and a ferromagnetic underlayer which forms an underlayer with respect to the stabilizing bias layer, where the ferromagnetic underlayer is made of a FeCo alloy, a FeCoNi alloy or a FeNi alloy which is added with at least one element selected from a group of Pt, Pd, Ir, Rh, Ru and Au. According to the magneto-resistive head of the present invention, it is possible to reduce the head noise and obtain a satisfactory head characteristic, and to prevent undulations from being generated in the write head so as to prevent deterioration of the recording and reproducing characteristics, and it is possible to obtain a satisfactory hard magnetic characteristic.

A further object of the present invention is to provide a magnetic recording and reproducing apparatus, which includes any one of the magneto-resistive heads described above. According to the magnetic recording and reproducing apparatus of the present invention, it is possible to reduce the head noise and obtain a satisfactory head characteristic, and to prevent undulations from being generated in the write head so as to prevent deterioration of the recording and reproducing characteristics, and it is possible to obtain a satisfactory hard magnetic characteristic.

Other objects and further features of the present invention will be apparent from the following detailed description when read in conjunction with the accompanying drawings.

DESCRIPTION OF THE PREFERRED EMBODIMENTS

Figure 3:
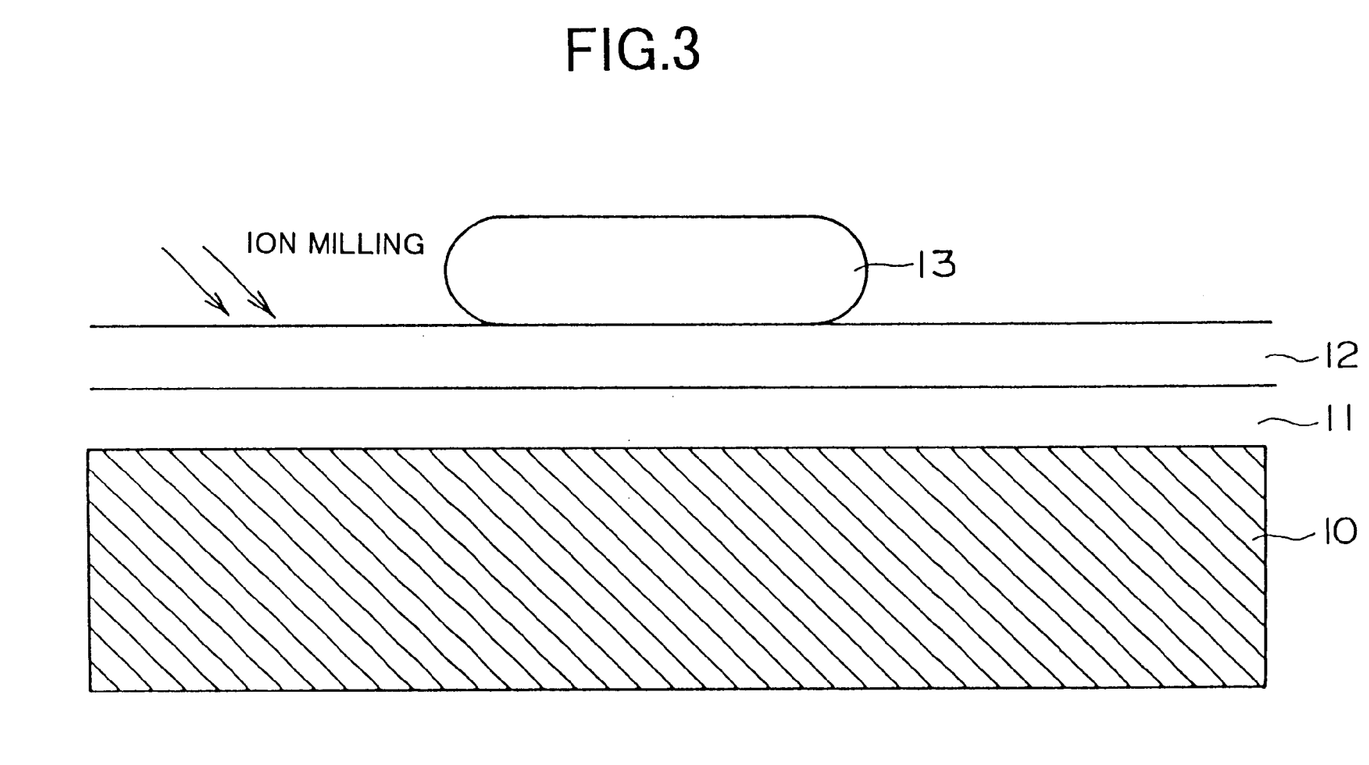
FIG. 3 is a cross sectional view for explaining a production process of a first embodiment of a magneto-resistive head according to the present invention.
Figure 4:
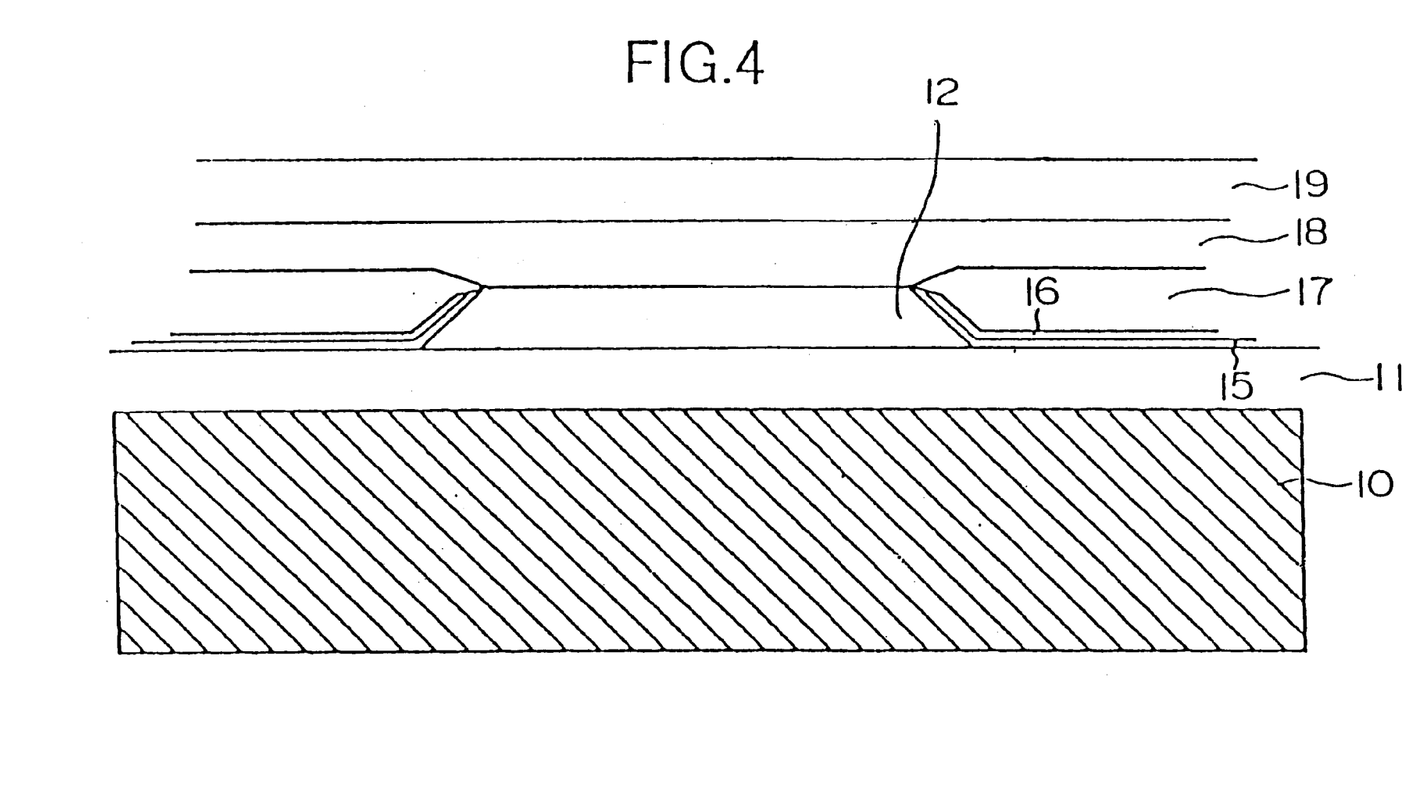
FIG. 4 is a cross sectional view showing an important part of the first embodiment of the magneto-resistive head.

First, a description will be given of a first embodiment of a magneto-resistive head according to the present invention. FIG. 3 is a cross sectional view for explaining a production process of the first embodiment of the magneto-resistive head, and FIG. 4 is a cross sectional view showing an important part of the first embodiment of the magneto-resistive head.

In FIG. 3, a lower shield layer 10 made of FeZrN is formed on a substrate (not shown) by sputtering, to a film thickness of 2 $\mu$m, for example. A lower gap layer 11 made of alumina ($Al_2O_3$) is formed on the lower shield layer 10 to a film thickness of 50 nm, for example. A magneto-resistive element (spin valve element) 12 is formed on the lower gap layer 11. This magneto-resistive element 12 is made of Ta(5)/NiFe(2)/CoFeB(1.5)/Cu(3)/CoFeB(2)/PdPtMn(20)/Ta (6), where the numbers in brackets indicate the respective film thicknesses in nm. Of course, the magneto-resistive element 12 is not limited to the spin valve element, and the magneto-resistive element 12 may be formed by AMR, TMR or the like.

Next, a resist layer 13 having a width of 1 $\mu$m and a height of 3 $\mu$m, for example, is formed on the magneto-resistive element 12 by a patterning. A dry etching is carried out using this resist layer 13 as a mask, so as to etch the magneto-resistive layer 12 until the lower gap layer 11 becomes exposed. In this state, a ferromagnetic underlayer 15 made of Fe and having a thickness of 1.6 nm, for example, and a hard magnetic layer 16 made of CoPt and having a thickness of 30 nm, for example, are successively formed on the exposed lower gap layer 11, as shown in FIG. 4. The hard magnetic layer 16 forms a stabilizing bias layer for applying a magnetization stabilizing bias field to a magneto-resistive layer of the magneto-resistive element 12. The thickness of the hard magnetic layer 16 desirably set so that the residual magnetization thereof is approximately 1 to 7 times the magnetization of a free layer of the magneto-resistive element 12.

Thereafter, element terminals 17 made of Ta and having a film thickness of 80 nm, for example, are formed on the hard magnetic layer 16. Layers such as an upper gap layer 18 made of alumina and having a film thickness of 50 nm, for example, and an upper shield layer 19 made of FeZrN and having a film thickness of 2 $\mu$m, for example, are formed after removing the resist layer 13. Since known processes can be used for the other production processes of the magneto-resistive head, [and] description and illustration thereof Will be omitted in this specification.

The hard magnetic layer 16 may be made of CoPt or, made of a Co-based alloy. For example, the magnetization of the Fe ferromagnetic underlayer 15 is 22 kGauss, and the magnetization of the CoPt hard magnetic layer 16 is 14 kGauss.

Next, a description will be given of a second embodiment of the magneto-resistive head according to the present invention. In this embodiment, the basic construction of the magneto-resistive head is the same as that of the first embodiment described above, and thus, the illustration of the second embodiment of the magneto-resistive head will be omitted. In this embodiment, the ferromagnetic underlayer 15 is made of FeCr in place of Fe, and the film thickness of the ferromagnetic underlayer 15 is set to 4 nm, for example, unlike in the first embodiment.

Figure 5:
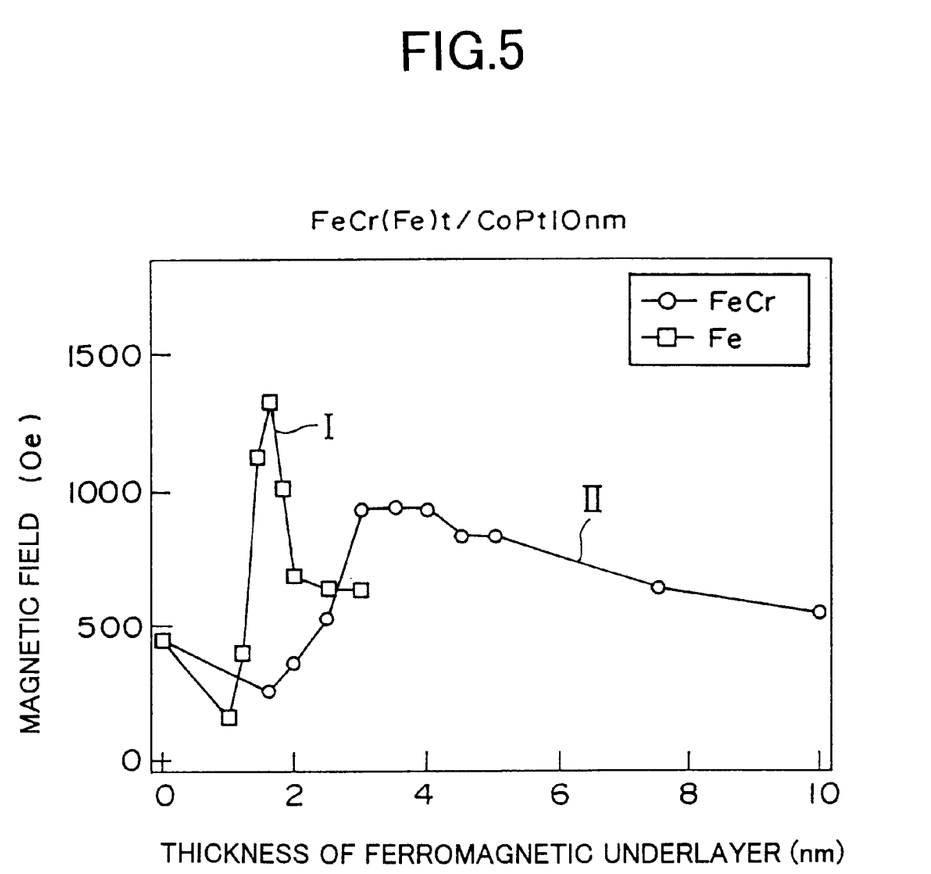
FIG. 5 is a diagram showing a magnetic characteristic of a CoPt hard magnetic layer of the first and second embodiments of the magneto-resistive head.

FIG. 5 is a diagram showing a magnetic characteristic of the CoPt hard magnetic layer 16 of the first and second embodiments of the magneto-resistive head. In FIG. 5, the ordinate indicates the magnetic field Hc (Oe), and the abscissa indicates the film thickness (nm) of the ferromagnetic underlayer 15. In FIG. 5, a characteristic I corresponds to the first embodiment in which the ferromagnetic underlayer 15 is made of Fe, and a characteristic II corresponds to the second embodiment in which the ferromagnetic underlayer 15 is made of FeCr, where the film thickness of the CoPt hard magnetic layer 16 is 10 nm for both the characteristics I and II. It may be seen from the characteristic I that an optimum value of the film thickness of the Fe ferromagnetic underlayer 15 in the first embodiment is in a range of 1.3 to 2.5 nm. In addition, it may be seen from the characteristic II that an optimum value of the film thickness of the FeCr ferromagnetic underlayer 15 in the second embodiment is in a range of 2.5 nm or greater.

According to the first and second embodiments, it is possible to improve the magnetic characteristic of the hard magnetic layer 16 by using the Fe or FeCr ferromagnetic underlayer 15 having the optimum film thickness. In addition, when FeCr is used for the ferromagnetic underlayer 15, it is possible to further enlarge the range of the optimum film thickness of the ferromagnetic underlayer 15 as compared to the case where Fe is used for the ferromagnetic underlayer 15.

Furthermore, when CoPt is used for the hard magnetic layer 16, it is possible to reduce the film thickness of the hard magnetic layer 16 compared to the case where CoCrPt is used for the hard magnetic layer 16. As a result, no undulations are generated in the write head, thereby making it possible to realize a stable magneto-resistive head with reduced noise. Moreover, it is also possible to improve the production yield of the magneto-resistive head.

Next, a description will be given of a third embodiment of the magneto-resistive head according to the present invention. In this embodiment, the basic construction of the magneto-resistive head is the same as that of the first embodiment described above, and thus, the illustration of the third embodiment of the magneto-resistive head will be omitted. In this embodiment, the ferromagnetic underlayer 15 is made of a Fe-based alloy in place of Fe, and the film thickness of the ferromagnetic underlayer 15 is set to 2.5 to 4.9 nm, unlike in the first embodiment. The Fe-based alloy used in this embodiment is made of Fe and at least one element which is selected from a group of Co, Ni, Cr, Nb, Mo, Ta, V and W.

When forming the ferromagnetic underlayer 15 from a FeCr alloy, the Cr composition is desirably in a range of 10 to 20 at %.

Next, a description will be given of a fourth embodiment of the magneto-resistive head according to the present invention. In this embodiment, the basic construction of the magneto-resistive head is the same as that of the first embodiment described above, and thus, the illustration of the fourth embodiment of the magneto-resistive head will be omitted. In this embodiment, the ferromagnetic underlayer 15 is made of a Fe-based alloy in place of Fe, and the film thickness of the ferromagnetic underlayer 15 is set to 2.5 nm or greater, unlike in the first embodiment. The Fe-based alloy used in this embodiment is made of Fe and at least one element which is selected from a group of Pt, Pd, Ir, Rh, Ru and Au.

When forming the ferromagnetic underlayer 15 from a FePt alloy, the Pt composition is desirably in a range of 1 to 25 at %.

Figure 6:
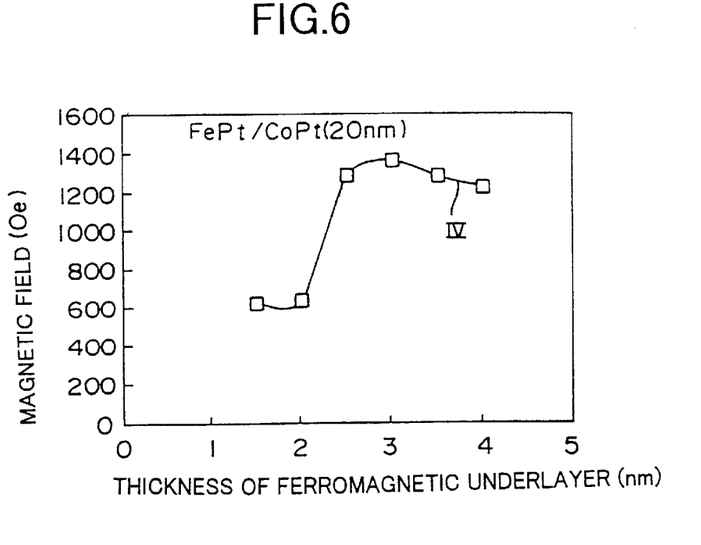
FIG. 6 is a diagram showing a magnetic characteristic of a CoPt hard magnetic layer of a fourth embodiment of the magneto-resistive head according to the present invention.

FIG. 6 is a diagram showing a magnetic characteristic of the CoPt hard magnetic layer 16 of the fourth embodiment of the magneto-resistive head. In FIG. 6, the ordinate indicates the magnetic field Hc (Oe), and the abscissa indicates the film thickness (nm) of the ferromagnetic underlayer 15, where the film thickness of the CoPt hard magnetic layer 16 is 20 nm. In FIG. 6, a characteristic IV corresponds to the fourth embodiment in which the ferromagnetic underlayer 15 is made of FePt, and it may be seen from this characteristic IV that the optimum value of the film thickness of the FePt ferromagnetic underlayer 15 is in a range of 2.5 nm or greater. Therefore, by using FePt for the ferromagnetic underlayer 15, it is possible to further enlarge the range of the optimum film thickness of the ferromagnetic underlayer 15 as compared to the case where Fe is used for the ferromagnetic underlayer 15.

Figure 7:
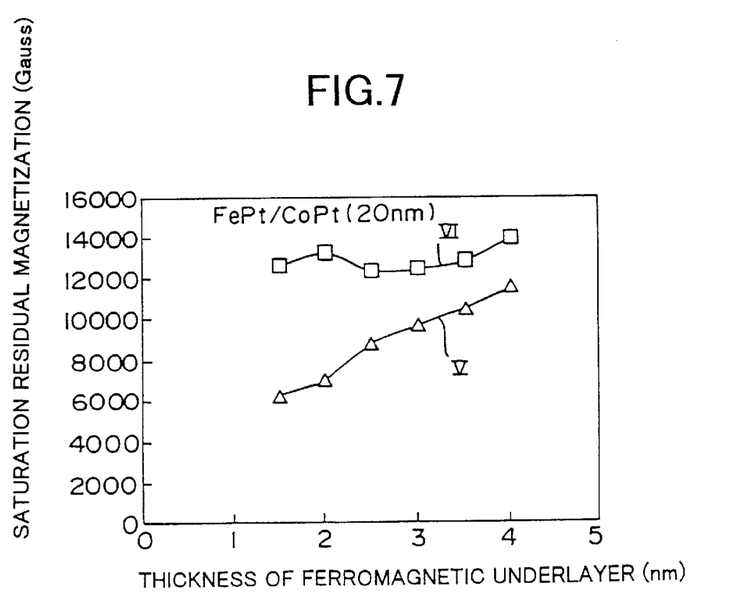
FIG. 7 is a diagram showing a magnetization characteristic of the CoPt hard magnetic layer of the fourth embodiment of the magneto-resistive head.

FIG. 7 is a diagram showing a magnetization characteristic of the CoPt hard magnetic layer 16 of the fourth embodiment. In FIG. 7, the ordinate indicates the residual magnetization (Gauss), and the abscissa indicates the film thickness (nm) of the ferromagnetic underlayer 15. In FIG. 7, a characteristic V corresponds to the first embodiment in which the ferromagnetic underlayer 15 is made of Fe, and a characteristic VI corresponds to the fourth embodiment in which the ferromagnetic underlayer 15 is made of FePt, where the film thickness of the CoPt hard magnetic layer 16 is 20 nm for both the characteristics V and VI.

It may be seen from the characteristic VI that an optimum value of the film thickness of the FePt ferromagnetic underlayer 15 in the fourth embodiment is in a range of 2.5 nm or greater, and that the magnetization obtainable is further higher than that obtainable by the use of the Fe ferromagnetic underlayer 15.

Figure 8:
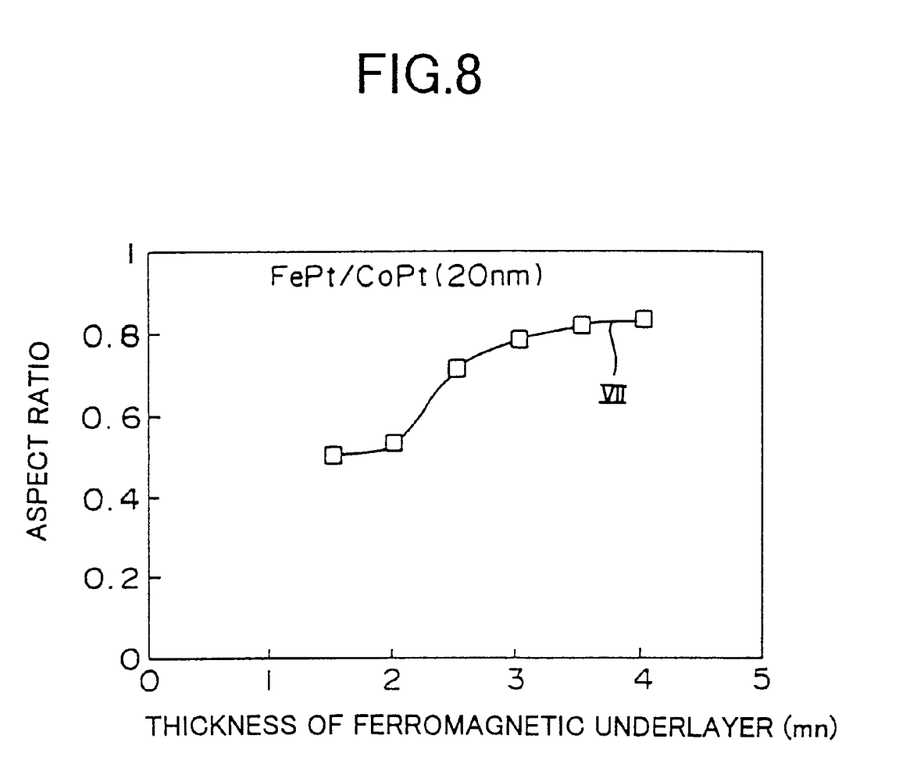
FIG. 8 is a diagram showing an aspect ratio of the CoPt hard magnetic layer of the fourth embodiment of the magneto-resistive head.

FIG. 8 is a diagram showing the aspect ratio of the CoPt hard magnetic layer 16 of the fourth embodiment. In FIG. 8, the ordinate indicates the aspect ratio, and the abscissa indicates the film thickness (nm) of the ferromagnetic underlayer 15. In FIG. 8, a characteristic VII corresponds to the fourth embodiment in which the ferromagnetic underlayer 15 is made of FePt, where the film thickness of the CoPt hard magnetic layer 16 is 20 nm. It may be seen from the characteristic VII that the optimum value of the film thickness of the FePt ferromagnetic underlayer 15 is in a range of 2.5 nm or greater.

Figure 9:
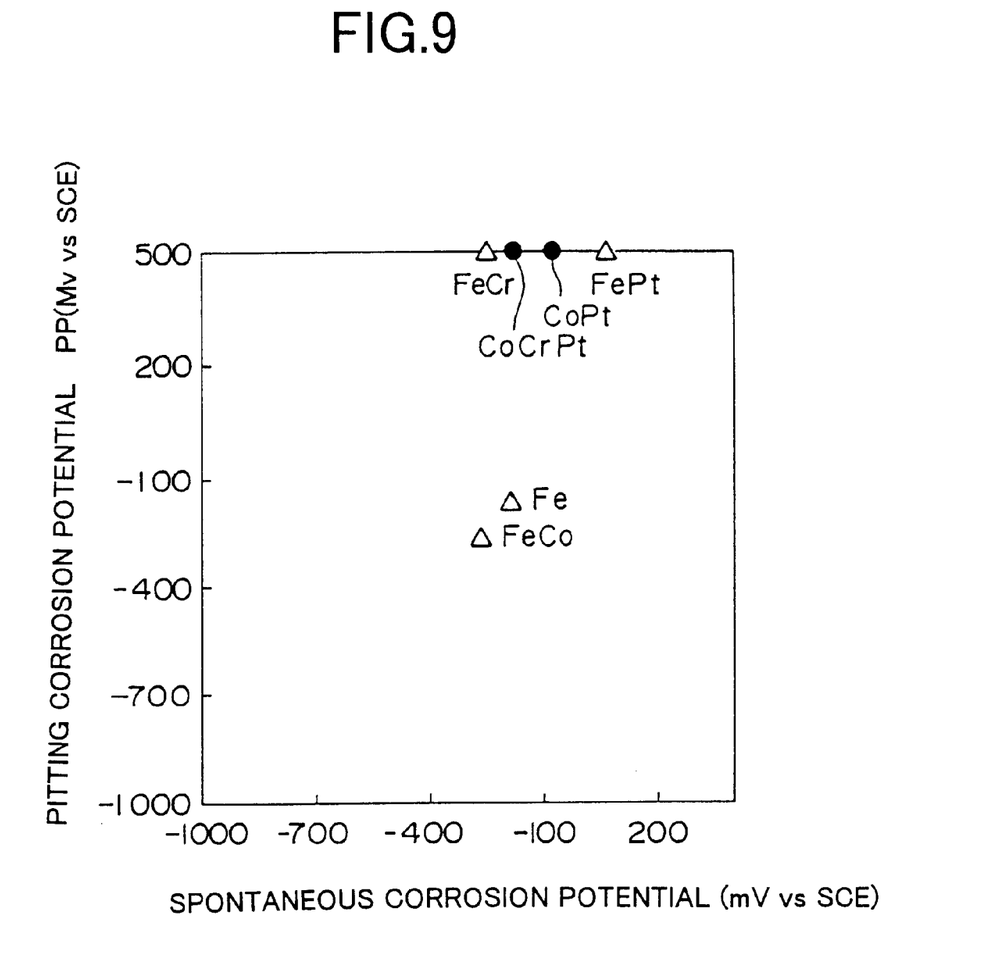
FIG. 9 is a diagram showing anti-corrosion characteristics of FeCr, CoCrPt, CoPt and FePt.

FIG. 9 is a diagram showing the anti-corrosion (corrosion resistance) characteristic, that is, measured results of anode polarization curves, with respect to FeCr, CoCrPt, CoPt and FePt.

In FIG. 9, the ordinate indicates the pitting corrosion potential, and the abscissa indicates the spontaneous corrosion potential. As may be seen from FIG. 9, the anti-corrosion characteristic of FePt is high compared to the anti-corrosion characteristics of FeCr, CoCrPt and CoPt, and is thus particularly suited for use as the ferromagnetic underlayer 15.

As described above, the Japanese Laid-Open Patent Application No.9-97409 proposes, adding to Fe, an element having a bcc crystal structure such as Cr, Nb, Mo and Ta, so as to maintain the bcc crystal structure of Fe. However, elements other than Cr did not show a satisfactory anti-corrosion characteristic or a satisfactory magnetic characteristic when combined with CoPt.

On the other hand, the present inventors confirmed through experiments which were conducted, that when an element having a fcc crystal structure such as Pt and Pd is added to Fe, the bcc crystal structure of Fe cannot be maintained structurally, but it is possible to greatly improve the anti-corrosion characteristic and the magnetic characteristic when combined with CoPt.

Next, a description will be given of a fifth embodiment of the magneto-resistive head according to the present invention. In this embodiment, the basic construction of the magneto-resistive head is the same as that of the first embodiment described above, and thus, the illustration of the fifth embodiment of the magneto-resistive resistive head will be omitted. In this embodiment, the ferromagnetic underlayer 15 is made of a FeCo-based alloy, a FeCoNi-based alloy or a FeNi-based alloy in place of Fe, unlike in the first embodiment.

The FeCo-based alloy, the FeCoNi-based alloy or the FeNi-based alloy used in this embodiment is made of FeCo, FeCoNi or FeNi and at least one element which is selected from a group of Pt, Pd, Ir, Rh and Ru.

Next, a description will be given of an embodiment of the magnetic recording and reproducing apparatus according to the present invention. This embodiment of the magnetic recording and reproducing apparatus uses any one of the first through fifth embodiments of the magneto-resistive head according to the present invention described above.

Figure 10:
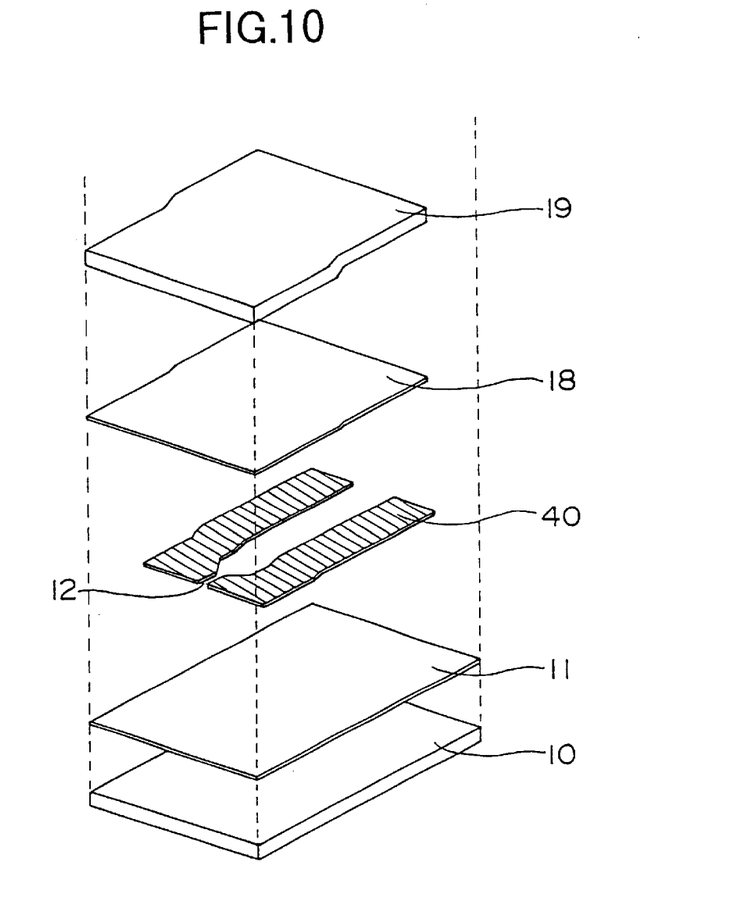
FIG. 10 is a disassembled perspective view of a magneto-resistive head used in an embodiment of a magnetic recording and reproducing apparatus according to the present invention.
Figure 11:
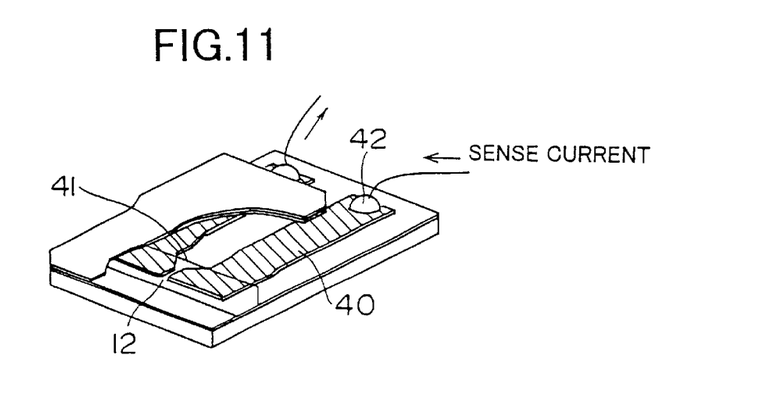
FIG. 11 is a perspective view showing the magneto-resistive head with a part of a top portion thereof removed.

FIG. 10 is a disassembled perspective view of a magneto-resistive head used in this embodiment of the magnetic recording and reproducing apparatus. FIG. 11 is a perspective view showing this magneto-resistive head with a top portion thereof removed. In FIGS. 10 and 11, those parts which are the same as those corresponding parts in FIG. 4 are designated by the same reference numerals, and a description thereof will be omitted.

In FIGS. 10 and 11, a draw-out conductor layer 40 is made up of the ferromagnetic underlayer 15, the hard magnetic layer 16 and the element terminals 17 shown in FIG. 4. After each of the layers shown in FIG. 10 are formed, a known process is carried out to grind the stacked structure down to a process surface 41 shown in FIG. 11, so as to make the magneto-resistive head. In FIG. 11, an electrode 42 is applied with a sense current.

Figure 12:
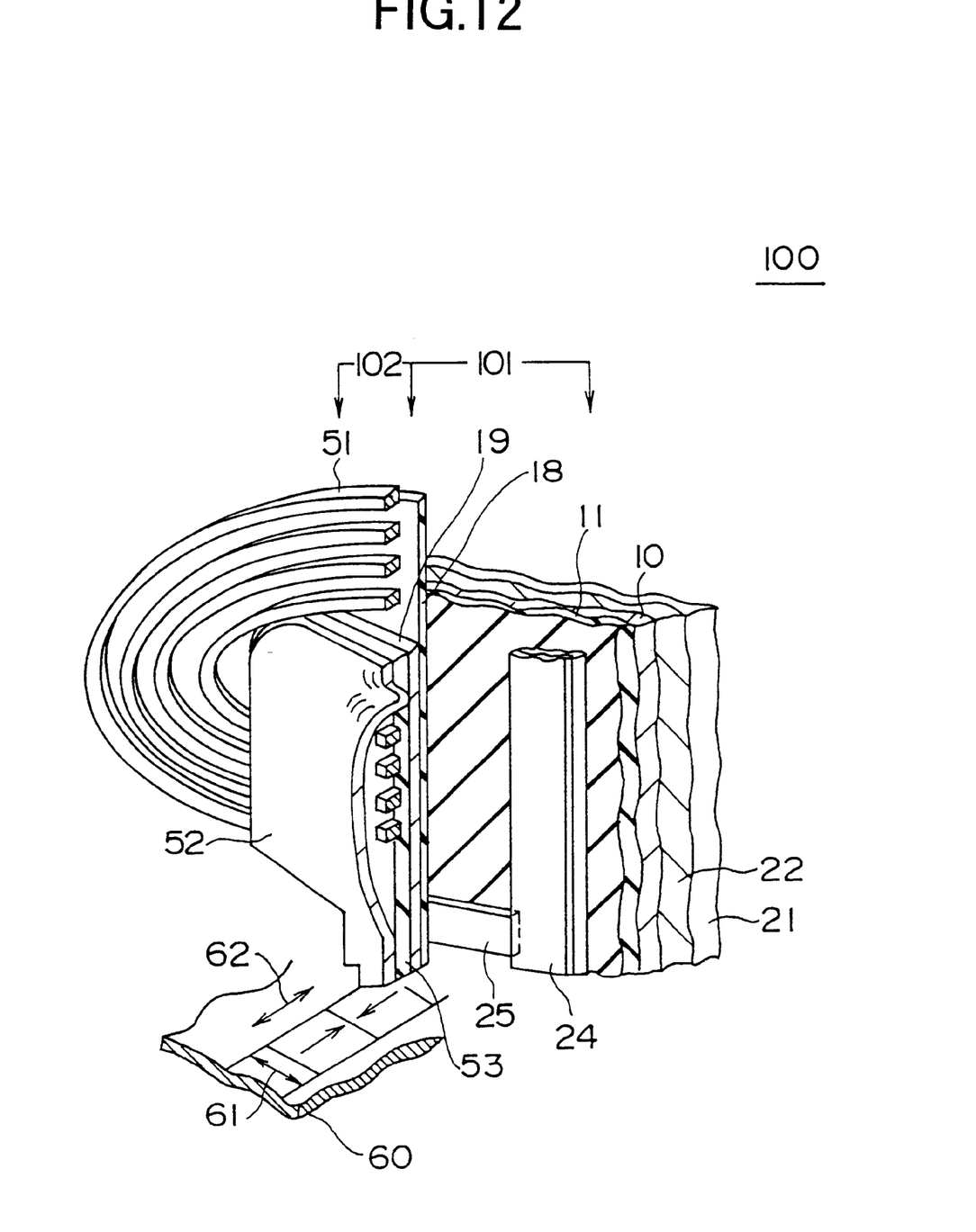
FIG. 12 is a perspective view showing an important part of a recording and reproducing head which integrally comprises the magneto-resistive head shown in FIGS. 10 and 11 and an inductive head.

FIG. 12 is a perspective view showing an important part of a recording and reproducing head 100 which integrally comprises the magneto-resistive head shown in FIGS. 10 and 11 and an inductive head. In FIG. 12, those parts which are the same as those corresponding parts in FIGS. 10 and 11 are designated by the same reference numerals, and a description thereof will be omitted. The basic construction of the recording and reproducing head 100 itself may employ a known construction, except for the construction of the draw-out conductor layer 40 of the magneto-resistive head, and for this reason, a detailed description thereof will be omitted.

In FIG. 12, reference numerals 21, 22, 24 and 25 respectively indicate a substrate, a substrate protection layer, a terminal, and a magnetic transducer. In addition, reference numerals 51, 52 and 53 respectively indicate a recording coil, a recording upper magnetic pole, and a recording gap. Furthermore, reference numerals 60, 61 and 62 respectively indicate a magnetic recording medium, a track width and a bit length. The magneto-resistive head forms a reproducing head part 101, and the inductive head forms a recording head part 102.

Figure 13:
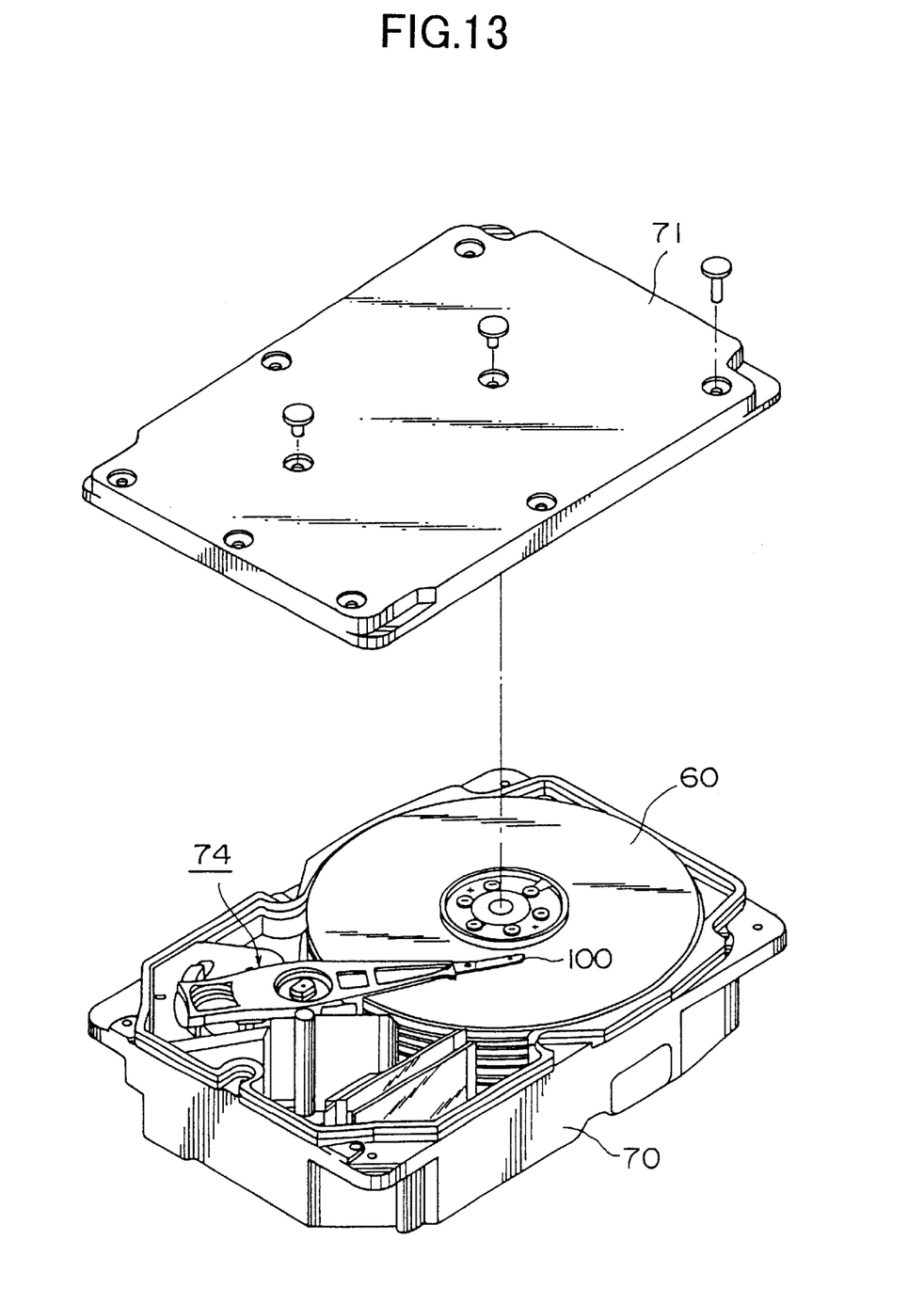
FIG. 13 is a disassembled perspective view showing an important part of the embodiment of the magnetic recording and reproducing apparatus.

FIG. 13 is a disassembled perspective view showing an important part of this embodiment of the magnetic recording and reproducing apparatus. In FIG. 13, a plurality of magnetic recording media 60 are provided within a housing 70, and the upper portion of the housing 70 is sealed by a lid 71 which is screwed onto the housing 70. A plurality of arms 74 are provided within the housing 70, and one recording and reproducing head 100 is provided at the tip end of each arm 74. The basic construction of this magnetic recording and reproducing apparatus itself, shown in FIG. 13, is also known, and for this reason. a detailed description thereof will be omitted.

Of course, the construction of the recording and reproducing head and the construction of the magnetic recording and reproducing apparatus to which the magneto-resistive head according to the present invention is applied, are not limited to those of the embodiments described above. Both the recording and reproducing head and the magnetic recording and reproducing apparatus may have any construction as long as it is possible to apply thereto the magneto-resistive head according to the present invention.

Further, the present invention is not limited to these embodiments, but various variations and modifications may be made without departing from the scope of the present invention.

What is claimed is:

1. A magneto-resistive head comprising:
    a stabilizing bias layer which applies a magnetization stabilizing bias field on a magneto-resistive layer of a magneto-resistive element; and
    a ferromagnetic underlayer which forms an underlayer with respect to said stabilizing bias layer,
    said ferromagnetic underlayer being made of Fe and having a film thickness in a range of 1.3 to 2.5 nm.

2. The magneto-resistive head as claimed in claim 1, wherein said stabilizing bias layer is made of a Co-based alloy or a CoPt alloy.

3. A magneto-resistive head comprising:
    a stabilizing bias layer which applies a magnetization stabilizing bias field on a magneto-resistive layer of a magneto-resistive element; and
    a ferromagnetic underlayer which forms an underlayer with respect to said stabilizing bias layer,
    said ferromagnetic underlayer being made of a Fe alloy which is added with at least one element selected from the group consisting of Co, Ni, Cr, Nb, Mo, Ta, V and W, and having a film thickness in a range of 2.5 to 4.9 nm.

4. The magneto-resistive head as claimed in claim 3, wherein said ferromagnetic underlayer is made of a FeCr alloy having a Cr composition of 10 to 20 at %.

5. A magneto-resistive head comprising:
    a stabilizing bias layer which applies a magnetization stabilizing bias field on a magneto-resistive layer of a magneto-resistive element; and
    a ferromagnetic underlayer which forms an underlayer with respect to said stabilizing bias layer,
    said ferromagnetic underlayer being made of a Fe alloy which is added with at least one element selected from the group consisting of Pt Pd, Ir, Rh, Ru and Au.

6. The magneto-resistive head as claimed in claim 5, wherein said ferromagnetic underlayer is made of a FePt alloy having a Pt composition of 1 to 25 at %.

7. The magneto-resistive head as claimed in claim 6, wherein said ferromagnetic underlayer has a film thickness in a range of 2.5 nm or greater.

8. The magneto-resistive head as claimed in claim 5, wherein said stabilizing bias layer is made of a CoPt alloy.

9. A magneto-resistive head comprising:
a stabilizing bias layer which applies a magnetization stabilizing bias field on a magneto-resistive layer of a magneto-resistive element; and
a ferromagnetic underlayer which forms An underlayer with respect to said stabilizing bias layer,
said ferromagnetic underlayer being de of a material selected from the group consisting of FeCo alloy, FeCoNi alloy and FeNi alloy, said material being added with at least one element selected from the group consisting of Pt, Pd, Ir, Rh, Ru and Au.

10. A magnetic recording and reproducing apparatus comprising:
a magneto-resistive head comprising:
a stabilizing bias layer which applies a magnetization stabilizing bias field on a magneto-resistive layer of a magneto-resistive element; and
a ferromagnetic underlayer which forms an underlayer with respect to said stabilizing bias layer,
said ferromagnetic underlayer being made of Fe and having a film thickness in a range of 1.3 to 2.5 nm.

11. A magnetic recording and reproducing apparatus comprising:
a magneto-resistive head comprising:
a stabilizing bias layer which applies a magnetization stabilizing bias field on a magneto-resistive layer of a magneto-resistive element; and
a ferromagnetic underlayer which forms an underlayer with respect to said stabilizing bias layer,
said ferromagnetic underlayer being made of a Fe alloy which is added with at least one element selected from the group consisting of Co, Ni, Cr; Nb, Mo, Ta, V and W, and having a film thickness in a range of 2.5 to 4.9 nm.

12. A magnetic recording and reproducing apparatus comprising:
a magneto-resistive head comprising:
a stabilizing bias layer which applies a magnetization stabilizing bias field on a magneto-resistive layer of a magneto-resistive element; and
a ferromagnetic underlayer which form an underlayer with respect to said stabilizing bias layer,
said ferromagnetic underlayer being made of a Fe alloy which is added with at least one element selected from the group consisting of Pt, Pd, Ir, Rh, Ru and Au.

13. A magnetic recording and reproducing apparatus comprising:
a magneto-resistive head comprising:
a stabilizing bias layer which applies a magnetization stabilizing bias field on a magneto-resistive layer of a magneto-resistive element; and
a ferromagnetic underlayer which forms an underlayer with respect to said stabilizing bias layer,
said ferromagnetic underlayer being made of a material selected from the group consisting of FeCo alloy, FeCoNi alloy and FeNi alloy, said material being added with at least one element selected from the group consisting of Pt, Pd, Ir, Rh, Ru and Au.

* * * * *

UNITED STATES PATENT AND TRADEMARK OFFICE
CERTIFICATE OF CORRECTION

PATENT NO.    : 6,477,020 B1
DATED         : November 5, 2002
INVENTOR(S)   : Aoshima et al.

It is certified that error appears in the above-identified patent and that said Letters Patent is hereby corrected as shown below:

Column 9,
Line 5, please replace "An" with -- an --
Line 7, please delete "de" and insert -- made --

Column 10,
Line 1, please replace "Cr; Nb" with -- Cr, Nb --

Signed and Sealed this

Eighth Day of April, 2003

JAMES E. ROGAN
*Director of the United States Patent and Trademark Office*